July 27, 1971  H. J. VEGTER  3,595,696
CORN STEEPING PROCESS AND APPARATUS
Filed March 3, 1969
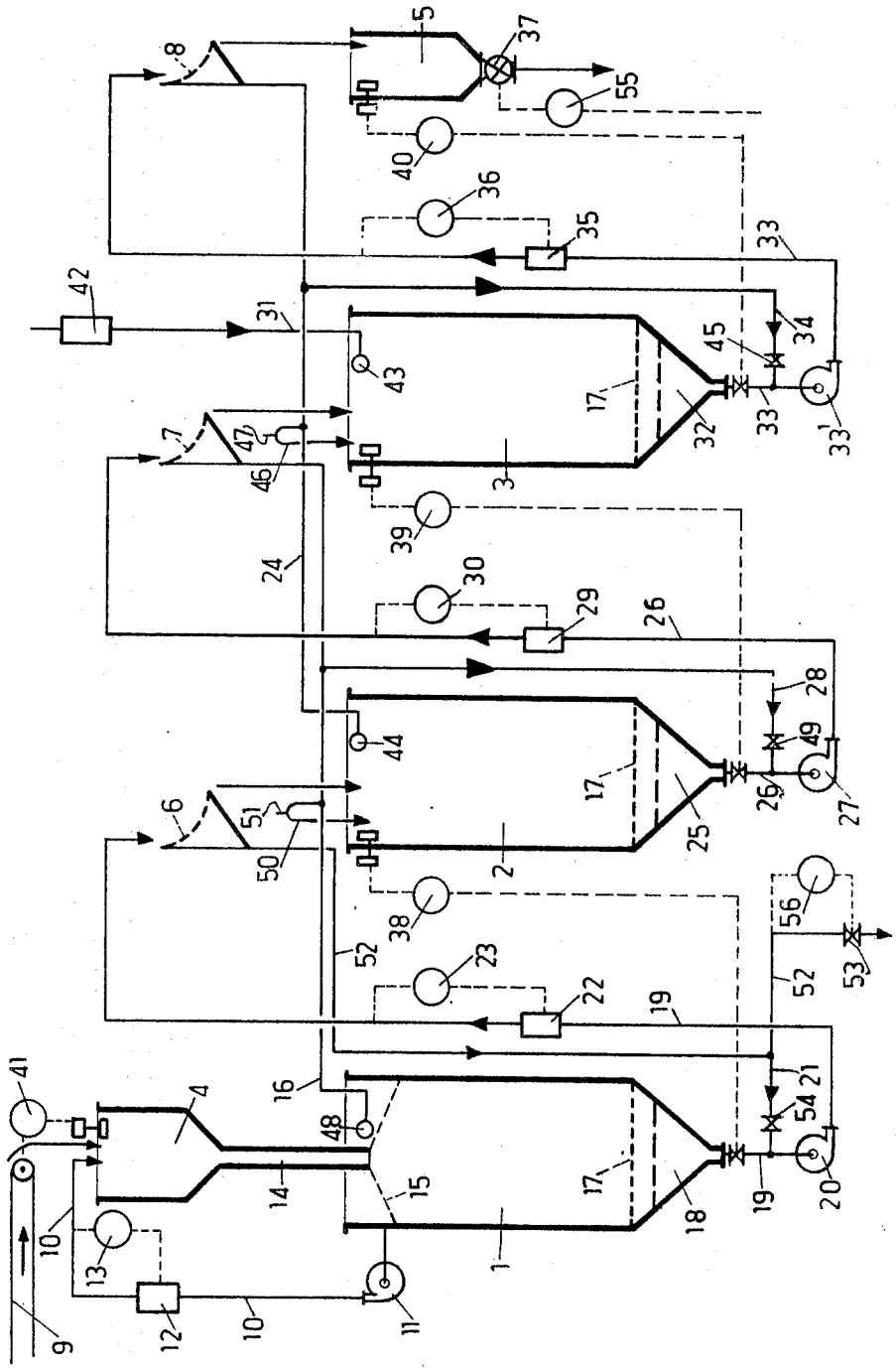
INVENTOR
HERMAN J. VEGTER
BY  *Smith & Smiley*
ATTORNEYS United States Patent Office 3,595,696
Patented July 27, 1971

3,595,696
CORN STEEPING PROCESS AND APPARATUS
Herman J. Vegter, Santpoort, Netherlands, assignor to
Honig N.V., Netherlands
Filed Mar. 3, 1969, Ser. No. 803,893
Int. Cl. C13l 1/02
U.S. Cl. 127—23                           11 Claims

ABSTRACT OF THE DISCLOSURE

Corn and steeping liquor are continuously passed in opposite senses through a number of reaction vessels connected in series. In each vessel, the flow of corn and liquor is concurrent. A corn-liquor mixture leaving each vessel is screened outside that vessel, whereupon the separated corn is passed to a next reaction vessel and the separated liquor to the preceeding reaction vessel.

---

This invention relates to a corn steeping process and to an apparatus usable therewith.

In the manufacture of corn starch, it is customary to subject fresh purified corn grains first to a prolonged steeping treatment in an aqueous solution of sulfur dioxide and/or lactic acid in order to prepare these grains for subsequent milling and starch separating operations. During such steeping treatment, the aqueous solution will extract a great deal of soluble substances from the corn grains. The resulting steep liquor may be used as a nutrient medium for microbiological fermentations or in concentrated form as a component of cattle feed.

The steeping treatment is usually effected in vertical reaction vessels by filling these vessels with a batch of corn, adding an amount of steeping liquor and applying heat to maintain the temperature at about 50° C. After completion of the treatment (in about 30 to 50 hours) the liquor is drained off and the corn is removed from the vessel and fed to a milling station.

In practice, a number of reaction vessels, e.g. three or four, are positioned next to each other and are filled one after the other with a batch of corn. In this way, the corn in the first filled vessel has undergone already a relatively long steeping treatment at the time of filling the last.

The steeping liquor is passed then through all these vessels in series, first entering the vessel in which the corn has already undergone a long steeping treatment, then passing to a vessel in which the corn has undergone a shorter steeping treatment etc., and finally entering the vessel filled with fresh corn. In each of these vessels, the steeping liquor will extract soluble substances from the corn so that it will grow gradually more concentrated in soluble components.

In spite of the counterflow used, this known system has many disadvantages. One thereof is, that the feeding and discharging operations of the corn must be effected at several points and at different times. In large-scale plants, this will require voluminous feeding and discharging means and many complicated controls. Another disadvantage is that each vessel will be partially empty during filling and discharging which means a loss of useful space and has for its consequence that the total number of vessels must be greater than strictly necessary. The successively operations of filling and discharging each vessel will also have an unfavorable influence on the useful life of such vessel because it will be subject to wear and even be damaged by incoming corn and liquor streams. Successive filling and discharging may also have an unfavorable effect on the water balance of the apparatus and will require large additional quantities of water amount for balancing any fluctuations in water demand.

A further disadvantage is that the known reaction vessels normally are provided with a screen for separating corn from liquor in their bottom parts. Such screens must be of heavy construction since they are subject to a large pressure exerted by the contents of each vessel.

A further disadvantage is that all corn grains remain stationary during the whole steeping treatment which will enlarge the chances of an irregular flow of liquor around such grains. Especially when using corn having broken grains, the chances of insufficiently steeped portions in a reaction vessel are numerous.

The invention has for its object now to prevent the disadvantages of the known process and to provide a corn steeping process and apparatus therefore which show several improvements above the state of the art.

The invention provides for a corn steeping process which comprises the following steps: continuously passing corn through a series of successive steeping stages, continuously passing a steeping liquor through the same series of successive steeping stages in opposite sequence to the corn, contacting corn with liquor on entering each steeping stage and passing them concurrently through such steeping stage in order to extract soluble substances from said corn by said liquor, collecting a mixture of corn and liquor on leaving each steeping stage, screening such mixture outside said steeping stage for separation into corn and liquor, passing the separated corn to the next steeping stage of said series, and passing separated liquor to the preceeding stage of said series.

Further, the invention provides for a corn steeping apparatus essentially comprising the following: a number of reaction vessels connected in series for contact between corn and steeping liquor, conveying means for continuously passing corn through the series of reaction vessels, conveying means for continuously passing steeping liquor through the series of reaction vessels in opposite sequence to the corn and through each steeping stage concurrently to the corn, a screen outside each reaction vessel for separating a mixture of corn and liquor into its components, conveying means for passing a mixture of corn and liquor collected from a reaction vessel to an appendant screen, means for feeding separated corn to the next reaction vessel and conveying means for passing separated liquor to the preceeding reaction vessel.

In this way and by means of this apparatus, the aforesaid objects may easily be reached. In the whole invented system, there is only one corn feeding point and one corn discharging point. Moreover, steeping liquor is only fed to the system in one point and discharged in another point. This results in a considerable simplification of feeding and discharging means and controls thereto. The whole system may be controlled automatically and adapted to the demand for steeped corn in subsequent stages of the plant.

Further, the whole space of the reaction vessels is used thanks to the continuous flow of corn therethrough. This means a gain in useful volume of about 15 to 30%. The useful life of the reaction vessels has also been lengthened thanks to the continuous flow of corn-liquor mixture through them.

The fact, that all mixtures of corn and liquor are screened outside the vessels permits a simpler construction of the vessels which may be constructed as described in my co-pending application No. 747,311. Moreover, there will be no fluctuations in water demand and consequently large additional quantities of water for balancing are not required.

Finally, the contact between corn and liquor in each reduction vessel will be intimate and very effective, thanks to the fact that they flow concurrently though such vessel The chances of an insufficient extraction of parts of the corn will thereby have been reduced considerably.

Other features and advantages of the invention process and apparatus will appear from the following description.

The invention is illustrated by the drawing which shows diagrammatically an apparatus for effecting the invented process together with the flow of materials therethrough.

In the arrangement as shown, there is a number of reaction vessels 1, 2, 3, for effecting the steeping operation together with a feed bunker 4 and a discharge bunker 5. Curved screens 6, 7 and 8 for separating corn and liquor are positioned above reaction vessels 2, 3 and discharge bunker 5, respectively.

Fresh purified corn to be treated is fed to bunker 4 by means of a conveyor 9 at such a rate that said bunker always remains filled.

In bunker 4, the corn grains are contacted with a stream of heated steep liquor from line 10 in order to bring them at the desired steeping temperature. This stream of steep liquor has been withdrawn from the upper part of vessel 1 by a pump 11 and has passed a heat exchanger 12 provided with temperature control 13 before entering the bunker 4. From bunker 4 the liquor flows downward around the grains of corn and returns to vessel 1.

The corn grains leave bunker 4 through a pipe 14 and enter vessel 1 just on top of a mass 14 of previously fed corn grains.

When they have arrived in vessel 1, the corn grains are contacted with a steeping liquor fed through line 16 and travel gradually downward to the bottom part of the vessel in concurrent relation to the steeping liquor. During this downward flow of corn and liquor, an intimate contact is ensured and part of the soluble substances in the fresh corn are extracted therefrom by the liquor. Reaction vessel 1 comprises plates 17 which are constructed in such a way that a sufficiently constant contact time between corn and liquor is effectuated but do not substantially obstruct the downward flow thereof. This reaction vessel may be constructed as claimed in my co-pending application No. 747,311.

On arriving at the bottom part 18 of reaction vessel 1, the corn-liquor mixture enters a line 19 and is passed continuously to screen 6 above reaction vessel 2 by means of a pump 20. The mixture may be diluted, if desired, with an additional amount of steep liquor from line 21 in order to improve its pumpability.

On its way to screen 6, the mixture of corn grains and liquor passes a heat exchanger 22 with temperature control 23 for maintaining a correct temperature. On screen 6, it is separated into steep liquor which passes through the screen and corn grains which do not pass through it.

The corn leaving screen 6 flows into reaction vessel 2, where it is contacted with steeping liquor fed by line 24. Both flow concurrently downward in intimate contact with each other and as a result thereof, another part of soluble substances is extracted from the corn by the now added liquor. Reaction vessel 2 is similar to vessel 1 and thus may also be provided with plates 17 of the type mentioned in my co-pending application No. 747,311.

On leaving the bottom part 25 of reaction vessel 2, a mixture of corn and liquor enters a line 26 and is passed by a pump 27 to curved screen 7 where it is separated into liquor that passes through the screen and corn that does not pass through it. An additional quantity of liquor from line 28 may be added to the mixture in order to improve its pumpability. On its way to the screen, the mixture passes a heat exchanger 22 with temperature control 30 for maintaining a correct temperature.

The corn separated on screen 7 flows to reaction vessel 3, where it is contacted with fresh steeping water from line 31. Both components pass concurrently downward through vessel 3 in intimate contact with each other and a third part of soluble substances is extracted from the grains by the steeping water. Reaction vessel 3 may have plates 17 of the same construction as in vessels 1 and 2.

On leaving the bottom part 32 of vessel 3, a mixture of corn and liquor enters line 33 and is passed by a pump 33' to screen 8 for separation into liquor and grains. An additional amount of liquor to improve pumpability may be added through line 34 and a heat exchanger 35 with temperature control 36 is present between pump and screen in order to maintain a correct temperature of the mixture.

The corn separated on screen 8 flows into bunker 5 from where it is discharged by means of a sluice 37. This corn has been freed then of a substantial part of its soluble substances and may be passed to a starch recovering plant.

In order to ensure that vessels 2 and 3 and bunkers 4 and 5 are always filled with corn to a substantially constant level during operation, these vessels and bunkers are provided with level controls 38, 39, 40, 41. Level controls 38, 39 and 40 are arranged to vary the passageway in discharge lines 19, 26, 33 of vessels 1, 2, 3 on variation of the corn level in vessels 2 and 3 and bunker 5, whilst level control 41 is arranged to vary the operation of feeding conveyor 9 on variation of the corn level in bunker 4.

Fresh steeping water which comprises sulfur dioxide and/or lactic acid is fed in the apparatus through line 31, thereby passing a heat exchanger 42 for bringing the water onto a desired temperature.

The steeping water enters reaction vessel 3 through a level control 43 and contacts the corn flowing from screen 7. It flows downward with this corn in order to extract soluble substances therefrom and becomes a steep liquor itself. After having reached the bottom of vessel 3, a mixture of corn and liquor is passed to screen 8 and separated there into corn and liquor. The major part of the liquor drained from screen 8 is passed through line 24 to vessel 2 where it enters through level control 44. Another part of it may flow, if desired, through line 34 and tap 45 to line 33 for diluting the mixture flowing therein. If the amount of liquor flowing through line 24 is too great for feeding vessel 2, then the excess may flow into vessel 3 through an overflow line 46 provided with deaerating means 47.

The liquor entering vessel 2 comes into contact with corn flowing from screen 6 and flows concurrently therewith downward, thereby extracting part of the soluble substances from this corn. A mixture of corn and liquor leaving vessel 2 is passed by pump 27 to screen 7 and separated there into corn and liquor. The major part of the liquor drained from screen 7 flows through line 16 to vessel 1 where it enters through level control 48. Another part of it may pass, if desired, through line 28 and tap 49 to line 26 in order to dilute the corn-liquor mixture flowing therein. Any excess liquor not admitted to vessel 1 may flow in vessel 2 by means of an overflow line 50 provided with deaeration means 51.

The liquor entering vessel 1 comes into contact with fresh corn from bunker 4 and flows concurrently therewith through vessel 1 downward to the bottom part of the vessel, thereby extracting soluble substances from the fresh corn. On leaving the vessel, a mixture of corn and liquor enters line 19 and is pumped to screen 6 where it is separated into corn and liquor. The liquor drained from screen 6 is relatively concentrated in soluble substances due to the fact that it has passed all three reaction vessels 1, 2 and 3. Its major part is passed through line 52 to valve 53 and discharged from the apparatus whilst another part is passed, if desired, through line 21 and tap 54 to line 19 for diluting the corn-liquor mixture flowing therein. The liquor discharged through valve 53 may be used as a nutrient medium for microbiological fermentations or, after drying, as a component of cattle feed.

Automatic controls 55 and 56 are positioned near corn discharge sluice 37 and near liquor discharge valve 53 in order to provide for automatic control of the product streams.

It will be seen that the steeping liquor passes through the whole apparatus in opposite sequence to the corn while it flows concurrently with corn through each reaction vessel.

Of course, the invention is not restricted to the illustrated embodiment and many variants clear to those skilled in the art are possible. Thus, the numbers of reaction vessels, the control systems, the way of feeding corn and the way of discharging corn may be varied without going beyond the scope of the appended claims.

I claim:

1. A corn steeping process comprising the following steps: continuously passing corn through a series of successive steeping stages, continuously passing a steeping liquor through the same series of steeping stages in opposite sequence to the corn, contacting corn with liquor on entering each steeping stage and passing said corn and said liquor concurrently through said each steeping stage in order to extract soluble substances from said corn by said liquor, collecting a mixture of corn and liquor on leaving said each steeping stage, separating said mixture outside of said each steeping stage to provide separate corn and liquor components, passing said corn component to the next steeping stage of said series and passing said liquor component to the preceeding steeping stage of said series.

2. The process of claim 1, wherein part of the separated liquor is recycled to an unseparated mixture of corn and liquor in order to dilute said unseparated mixture.

3. The process of claim 1, wherein fully steeped corn is recovered beyond the last steeping stage of said series and relatively concentrated steep liquor is recovered beyond the first steeping stage of said series.

4. The process of claim 1, wherein said mixture of corn and liquor issuing from said each steeping stage is separated near said next steeping stage.

5. The process of claim 4, wherein a further part of the separated liquor component obtained from the mixture issuing from at least certain of said steeping stage is recycled to the steeping stage from which the mixture issued.

6. An apparatus for effecting a corn steeping process, comprising the following: a number of reaction vessels connected in series for contact between corn and steeping liquor, conveying means for continuously passing corn through the series of reaction vessels, conveying means for continuously passing steeping liquor through the series of reaction vessels in opposite sequence to the corn and through each reaction vessel concurrently with the corn, separating means outside each reaction vessel for separating a mixture of corn and liquor into its components, conveying means for passing a mixture of corn and liquor from a reaction vessel to an associated one of said separating means, means for feeding separated corn to the next reaction vessel of the series and means for conveying separated liquor to the preceeding reaction vessel of the series.

7. The apparatus of claim 6, wherein each of said separating means associated with one of said reaction vessels is positioned above said next reaction vessel of said series.

8. The apparatus of claim 6, further comprising means for recovering fully steeped corn beyond the last reaction vessel of said series and means for recovering relatively concentrated steep liquor beyond the first reaction vessel of said series.

9. The apparatus of claim 6, further comprising conveying means for recycling part of the liquor component obtained from the mixture issuing from at least certain of said reaction vessels to an unseparated mixture.

10. The apparatus of claim 9, further comprising overflow means for recycling a further part of the liquor component obtained from the mixture issuing from at least certain of said reaction vessels to the reaction vessel from which the mixture issued.

11. In a corn steeping system, in combination:
a series of reaction vessels for contact between corn and steeping liquor forming a mixture in each vessel;
separating means associated with each vessel for separating a mixture of corn and liquor issuing therefrom into corn and liquor components;
means for passing said corn components to flow continuously through each vessel and in one direction through said series of vessels; and
means for passing said liquor components to flow continuously through each vessel concurrently with corn flow therethrough and through said series of vessels in the opposite direction to said flow of corn components through said series of vessels.

References Cited

UNITED STATES PATENTS

| 925,583 | 6/1909 | Lenders | 127—23 |
| 1,955,112 | 4/1934 | Curry | 127—68 |
| 2,186,303 | 6/1940 | McCoy | 127—23X |
| 2,322,413 | 6/1943 | Bishop | 127—68 |

MORRIS O. WOLK, Primary Examiner

S. MARANTZ, Assistant Examiner

U.S. Cl. X.R.

127—68